US010706047B2

(12) United States Patent
Buchmann (10) Patent No.: US 10,706,047 B2
(45) Date of Patent: Jul. 7, 2020

(54) BOOLEAN CONTENT SEARCH (71) Applicant: Daniel Buchmann, Eggenstein (DE)

(72) Inventor: Daniel Buchmann, Eggenstein (DE)

(73) Assignee: SAP SE, Walldorf (DE)

(*) Notice: Subject to any disclaimer, the term of this patent is extended or adjusted under 35 U.S.C. 154(b) by 1365 days.

(21) Appl. No.: 13/656,886

(22) Filed: Oct. 22, 2012

(65) Prior Publication Data

US 2014/0115000 A1  Apr. 24, 2014

(51) Int. Cl.
*G06F 17/00* (2019.01)
*G06F 7/00* (2006.01)
*G06F 16/2452* (2019.01)

(52) U.S. Cl.
CPC .............. *G06F 16/24522* (2019.01)

(58) Field of Classification Search
CPC .................................. G06F 17/3043
USPC .......................................... 707/759
See application file for complete search history.

(56) References Cited

U.S. PATENT DOCUMENTS

| 4,417,305 | A | * | 11/1983 | Berstis | G06F 9/30029 712/223 |
| 5,175,814 | A | * | 12/1992 | Anick et al. | 715/835 |
| 6,439,783 | B1 | * | 8/2002 | Antoshenkov | G06F 16/24524 707/999.002 |
| 6,598,040 | B1 | * | 7/2003 | Cragun | G06F 17/3064 |
| 6,751,606 | B1 | * | 6/2004 | Fries | G06F 17/30864 |
| 7,613,719 | B2 | * | 11/2009 | Chang | G06F 16/243 707/999.003 |
| 7,873,611 | B2 | * | 1/2011 | Ebersole | G06F 17/30436 707/701 |
| 2002/0120623 | A1 | * | 8/2002 | Vivier et al. | 707/3 |
| 2003/0126152 | A1 | * | 7/2003 | Rajak | G06F 17/30607 707/999.101 |
| 2004/0093344 | A1 | * | 5/2004 | Berger | G06F 16/25 707/999.102 |
| 2004/0216030 | A1 | * | 10/2004 | Hellman | G06F 16/84 715/239 |
| 2005/0043940 | A1 | * | 2/2005 | Elder | G06F 17/3043 704/9 |
| 2005/0193009 | A1 | * | 9/2005 | Reinhardt | G06F 17/2247 |
| 2005/0210061 | A1 | * | 9/2005 | Chang | G06F 16/243 707/999.102 |
| 2008/0195610 | A1 | * | 8/2008 | Tin | G06F 17/30935 |
| 2009/0063435 | A1 | * | 3/2009 | Ebersole | G06F 16/24526 707/999.004 |
| 2009/0063436 | A1 | * | 3/2009 | Ebersole | G06F 16/24526 707/999.004 |
| 2010/0274802 | A1 | * | 10/2010 | Abe | 707/769 |

(Continued)

OTHER PUBLICATIONS

"Generating Query Substitutions," by Jones et al. IN: Proc. 15th Int'l Conf. WWW, pp. 387-396 (2006). Available at: ACM.*

(Continued)

*Primary Examiner* — Pavan Mamillapalli
(74) *Attorney, Agent, or Firm* — Buckley, Maschoff & Talwalkar LLC (57) ABSTRACT A system includes reception of a query comprising one or more search terms, determination that one of the one or more search terms corresponds to a table column comprising Boolean operators, determination of a value of the table column corresponding to TRUE, and addition of a condition to the query, the condition specifying the value of the table column.

16 Claims, 5 Drawing Sheets (56) References Cited

U.S. PATENT DOCUMENTS

| | | | | |
|---|---|---|---|---|
| 2011/0283176 A1* | 11/2011 | Zulian | ............... | G06Q 10/10 |
| | | | | 715/212 |
| 2012/0254143 A1* | 10/2012 | Varma | ............... | G06F 17/30401 |
| | | | | 707/706 |
| 2013/0086019 A1* | 4/2013 | Dantale | ............... | 707/705 |
| 2013/0297586 A1* | 11/2013 | Singh | ............... | G06F 17/30442 |
| | | | | 707/719 |

OTHER PUBLICATIONS

"How to Select All Except some columns in a table," by Postgres OnLine Journal (2008). Available at: http://www.postgresonline.com/journal/archives/41HowtoSELECTALLEXCEPTsomecolumnsinatable.html.*

"SQL Tutorial—Data Types," by Erack Network (copyright 2003-2008, wayback machine date of Oct. 20, 2011). Available at: https://web.archive.org/web/20111020000351/http://www.tizag.com/sqlTutorial/sqldatatypes.php; Original URL: http://www.tizag.com/sqlTutorial/sqldatatypes.php.*

* cited by examiner

| Customer_ID | Name | Address | Active | Married |
|---|---|---|---|---|
| ~~~~~ | ~~~~~ | ~~~~~ | 0 | yes |
| ~~~~~ | ~~~~~ | ~~~~~ | 1 | no |
| ~~~~~ | ~~~~~ | ~~~~~ | 1 | yes |
| ~~~~~ | ~~~~~ | ~~~~~ | 0 | no |

BOOLEAN CONTENT SEARCH

BACKGROUND

Database tables include columns, with each record of a table storing a value (or NULL) for each column of the table. Some systems provide plain text keyword searching of the stored database record values in order to identify relevant records. Table columns which include Boolean operators (e.g., 0/1, Yes/No, TRUE/FALSE, NULL/X, etc.) do not include any semantic information which is usable to identify relevant records. In other words, including search terms such as "Yes" or "1" in a keyword search does not typically assist in identifying desired records because the semantic meaning behind those search terms is unknown.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
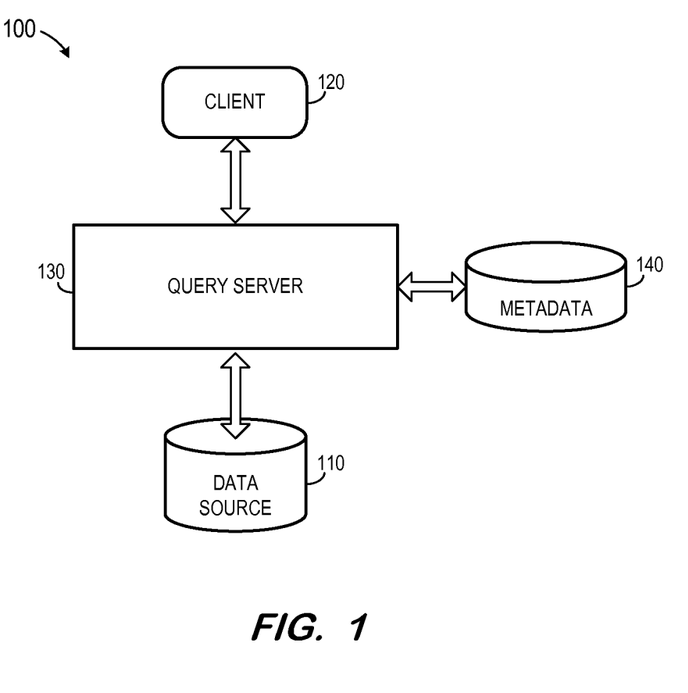
FIG. 1 is a block diagram of a system according to some embodiments.

FIG. 1 is a block diagram of system 100 according to some embodiments. System 100 includes data source 110, client 120, and query server 130. Data source 110 may comprise any query-responsive data source or sources that are or become known, including but not limited to a structured-query language (SQL) relational database management system. Data source 110 may comprise a relational database, a multi-dimensional database, an eXtendable Markup Language (XML) document, or any other data storage system storing structured and/or unstructured data. The data of data source 110 may be distributed among several relational databases, dimensional databases, and/or other data sources. Embodiments are not limited to any number or types of data sources. For example, data source 110 may comprise one or more OnLine Analytical Processing (OLAP) databases, spreadsheets, text documents, presentations, etc.

In some embodiments, data source 110 is implemented in Random Access Memory (e.g., cache memory for storing recently-used data) and one or more fixed disks (e.g., persistent memory for storing their respective portions of the full database). Alternatively, data source 110 may implement an "in-memory" database, in which volatile (e.g., non-disk-based) memory (e.g., Random Access Memory) is used both for cache memory and for storing its entire respective portion of the full database. In some embodiments, the data of data source 110 may comprise one or more of conventional tabular data, row-based data, column-based data, and object-based data. Data source 110 may also or alternatively support multi-tenancy by providing multiple logical database systems which are programmatically isolated from one another. Moreover, the data of data source 110 may be indexed and/or selectively replicated in an index to allow fast searching and retrieval thereof.

Query server 130 generally provides data of data source 110 to reporting clients such as client 110. The data may be provided based on metadata 140, which provides information regarding the structure, relationships and meaning of the data of data source 110.

In some embodiments, metadata 140 describes database tables of data source 110. The descriptions may include table names, technical names and data types of each table column, and, in some embodiments, language-dependent column names. Usage of such column names according to some embodiments will be described below.

According to one example, query server 130 receives a query from client 120. Query server 130 generates an SQL script based on the query and on metadata 140. The SQL script is forwarded to data source 110, which executes the query and returns a dataset based on the SQL script. Query server 130 then returns the dataset to the client 120. Embodiments are not limited thereto.

Client 120 may comprise one or more devices executing program code of a software application for presenting user interfaces to allow interaction with query server 130. Presentation of a user interface may comprise any degree or type of rendering, depending on the type of user interface code generated by query server 130. For example, client 120 may execute a Web Browser to receive a Web page (e.g., in HTML format) from query server 130, and may render and present the Web page according to known protocols. Client 120 may also or alternatively present user interfaces by executing a standalone executable file (e.g., an .exe file) or code (e.g., a JAVA applet) within a virtual machine. System 100 may include any number of clients 120 of one or more types according to some embodiments.

Figure 2:
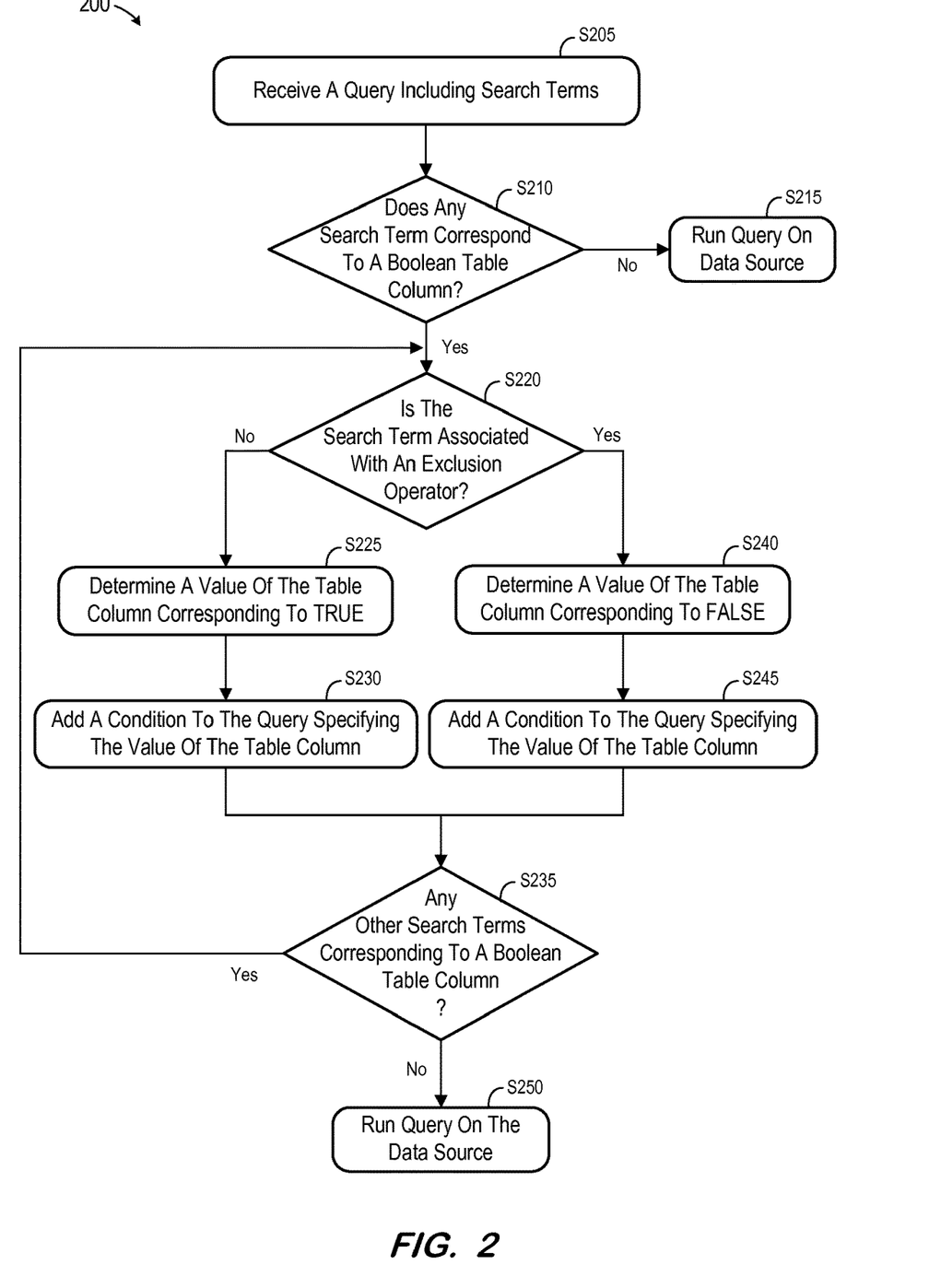
FIG. 2 is a flow diagram of a process according to some embodiments.

FIG. 2 comprises a flow diagram of process 200 according to some embodiments. In some embodiments, various hardware elements of query server 110 execute program code to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
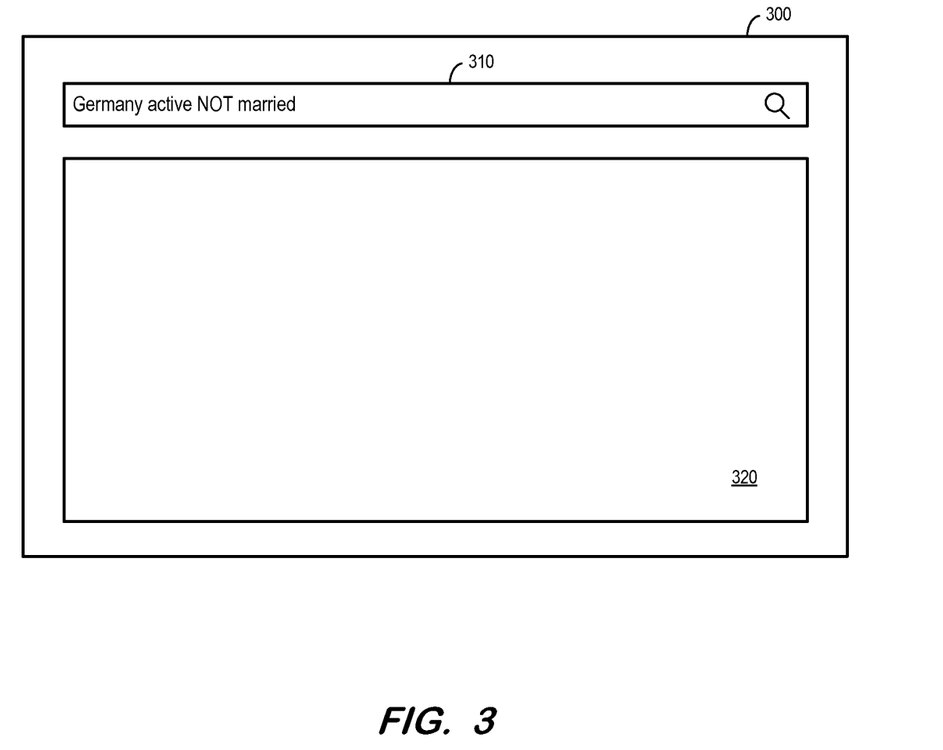
FIG. 3 comprises a view of a search interface according to some embodiments.

Initially, a query is received at S205. The query includes one or more search terms and may be received by query server 130 from client 120. FIG. 3 illustrates interface 300 from which a query is received in one embodiment of S205. Interface 300 may be a Web page provided by query server 130 in response to a request from client 120. Client 120 may execute any client application to display interface 300, which is not limited to Web-based formats. Interface 300 includes input field 310 to receive a query, and area 320 to display query results received from query server 130.

As shown, input field 310 includes the query "Germany active NOT married". The query includes the search terms "Germany", "active" and "married". The text "NOT" is an operator and is not considered a search term according to some embodiments.

Continuing with process 200, it is determined at S210 whether any search term of the query corresponds to a Boolean table column. A Boolean table column is a column of a database table whose values consist of Boolean operators. Examples of Boolean operators include, but are not limited to, 0/1, Yes/No, TRUE/FALSE, NULL/X.

S210 therefore includes determination of whether any search term of the query corresponds to a column of a table stored in data source 110, and whether the corresponding column is a Boolean table column. Metadata 140 may be used for both of these determinations.

According to some embodiments, and as described above, metadata 140 may include a language-dependent description of columns within data source 110. Therefore, at S210, each search term may be compared against the language-dependent descriptions to identify any correspondences. The correspondences may be fuzzily determined, so that, for example, the search term "aktive" is determined to correspond to a column named "active". The language-dependent descriptions may be stored in metadata 140 during design time.

Metadata 140 may also indicate whether a corresponding column is a Boolean table column. For example, metadata 140 may specify a data type of each column and, in some embodiments, the data type of a column specifies whether the column includes Boolean operators. Indications of whether columns are Boolean table columns may also be stored in metadata 140 during design time.

In some embodiments, identification of Boolean table columns and storage of corresponding metadata occurs just prior to runtime. For example, the values of each table column (or of only those table columns whose data type indicates that they might be Boolean table columns) are analyzed to determine if they reflect Boolean operators. The table columns which are determined to include Boolean operators are indicated as such in metadata 140. The foregoing determination is facilitated in the case of column-based storage, since all values of a column are stored in contiguous memory locations. The determination may also occur during runtime, at the cost of some runtime performance.

Figure 4:
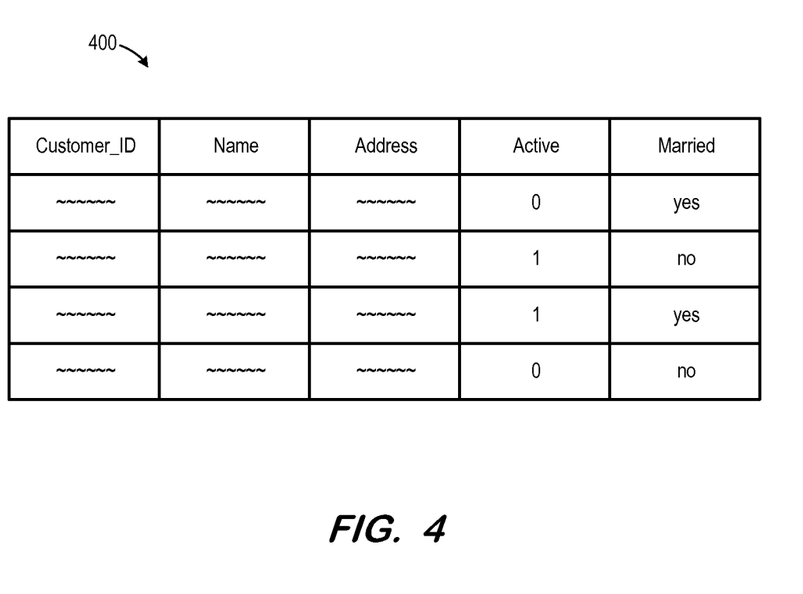
FIG. 4 is a tabular representation of a portion of a database table according to some embodiments.

FIG. 4 is a tabular representation of a portion of database table 400 according to some embodiments. For purposes of describing an example of process 200, it will be assumed that table 400 is the only database table in datastore 110. It will also be assumed that metadata 140 specifies each column name of table 400, and specifies that the columns "Active" and "Married" are Boolean table columns.

Therefore, at S210, it is determined that the search term "active" corresponds to a Boolean table column (i.e., the column "Active" of table 400). Flow then continues to S220 to determine whether the search term is associated with an exclusion operator. Some search query syntaxes provide for an exclusion operator, which is a string to be associated with a particular search term and intended to indicate that records including the particular search term are not to be included in the search results. The search term "active" is not associated with an exclusion operator in the present example, so flow proceeds to S225.

A value of the table column corresponding to the Boolean TRUE is determined at S225. S225 assumes that the presence of the search term in the query indicates that the query results should include records for which the logical state indicated by the search term is TRUE. Specifically, S225 assumes that the search term "active" was included in the query to retrieve only those records for the state "active" is TRUE.

The TRUE value may be determined from metadata 140 or by examining the values of the table column. In the latter regard, the column values may be examined to determine whether they include "1", "Yes", "T", "TRUE", or another known proxy for the Boolean TRUE. According to the present example, the value "1" is determined to correspond to TRUE for the table column "Active".

Next, at S230, a condition specifying the determined value of the table column is added to the search query. For example, the query "Germany active NOT married" may be changed at S230 to the query "Germany active NOT married AND (column "AA_1"="1")", where "AA_1" is the technical name of the column "Active" and is determined from metadata 140.

According to some embodiments, the search term is also removed from the query at S230 because the added condition provides the semantics intended by the search term. In such embodiments, the query produced at S230 may be "Germany NOT married AND (column "AA_1"="1")".

Flow continues to S235 to determine whether any other search term of the query corresponds to a Boolean table column as described above with respect to S210. According to the present example, the search term "married" corresponds to the Boolean table column "Married", so flow returns to S220.

The search term "married" is associated with the exclusion operator "NOT" according to the syntax of the present example. Accordingly, at S240, a value of the table column corresponding to the Boolean FALSE is determined. S240 assumes that the presence of the search term in association with an exclusion operator indicates that the query results should not include records for which the logical state indicated by the search term is FALSE. In this example, S240 assumes that the search term "married" was included in the query to retrieve only those records for the state "married" is FALSE.

The FALSE value may be determined from metadata 140 or by examining the values of the table column. Similarly to S225, the column values may be examined to determine whether they include "0", "No", "F", "FALSE", or another known proxy for the Boolean FALSE. According to the present example of table 400, the value "no" is determined to correspond to FALSE for the table column "Married".

A condition specifying the determined value of the table column is added to the search query at S245. For example, the current query "Germany NOT married AND (column "AA_1"="1")" may be changed at S245 to the query "Germany NOT married AND (column "AA_1"="1") AND (column "MM_1"="no")", where "MM_1" is the technical name of the column "Married" of table 400 and is determined from metadata 140.

In some embodiments, the search term and the exclusion operator are removed from the query at S245 because the added condition provides the semantics intended by the search term and the exclusion operator. For example, the query produced at S245 may be "Germany AND (column "AA_1"="1") AND (column "MM_1"="no")".

Flow again returns to S235 to determine whether any other search terms of the query correspond to a Boolean table column. If not, flow proceeds to S250 to run the modified query. In some embodiments of S250, query server 130 generates an SQL script based on the modified query and forwards the SQL script to data source 110, which executes the query and returns a dataset to query server 130 based on the SQL script. Query server 130 then presents the results to client 120.

In contrast to the foregoing example, a search query may include only one search term corresponding to a Boolean table column and not associated with an exclusion operator, or only one search term corresponding to a Boolean table column and associated with an exclusion operator.

Figure 5:
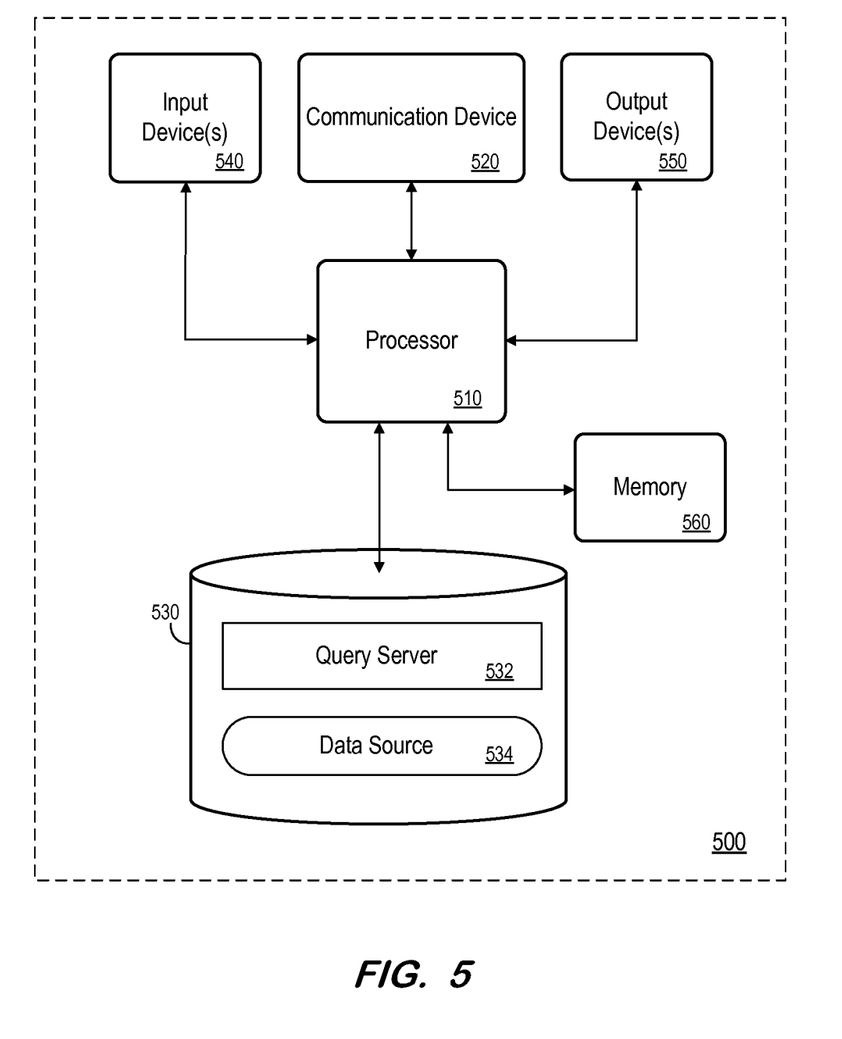
FIG. 5 is a block diagram of an apparatus according to some embodiments.

FIG. 5 is a block diagram of apparatus 500 according to some embodiments. Apparatus 500 may comprise a general-purpose computing apparatus and may execute program code to perform any of the functions described herein. Apparatus 500 may comprise an implementation of query server 130 and data source 110, or of the entirety of system 100. Apparatus 500 may include other unshown elements according to some embodiments.

Apparatus 500 includes processor 510 operatively coupled to communication device 520, data storage device 530, one or more input devices 540, one or more output devices 550 and memory 560. Communication device 520 may facilitate communication with external devices, such as a reporting client, or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into apparatus 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM).

Query server 532 may comprise program code executed by processor 510 to cause apparatus 500 to perform any one or more of the processes described herein. Embodiments are not limited to execution of these processes by a single apparatus. Data source 534 may implement data source 110 as described above. As also described above, data source 110 may be implemented in volatile memory such as memory 560. Data storage device 530 may also store data and other program code for providing additional functionality and/or which are necessary for operation of apparatus 500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a data storage device storing data;
a computing device comprising:
a memory storing processor-executable program code; and
a processor to execute the processor-executable program code in order to cause the computing device to:
receive a query comprising one or more search terms;
determine that one of the one or more search terms corresponds to a language-dependent table column name associated with a table column in metadata, the table column comprising Boolean operators;
determine a value of the table column corresponding to TRUE; and
add a condition to the query to change the query, the condition specifying a technical name of the table column as determined from metadata and the value of the table column.

2. The system according to claim 1, the processor to further execute the processor-executable program code in order to cause the computing device to:
remove the one of the one or more search terms from the query.

3. The system according to claim 1, the processor to further execute the processor-executable program code in order to cause the computing device to:
determine that a second one of the one or more search terms corresponds to a second language-dependent table column name associated with a second table column in metadata, the second table column comprising Boolean operators, and wherein the second table column is associated with an exclusion operator;
determine a second value of the second table column corresponding to FALSE; and
add a second condition to the query, the second condition specifying a technical name of the second table column as determined from metadata and the second value of the second table column.

4. The system according to claim 1, the processor to further execute the processor-executable program code in order to cause the computing device to:
receive a second query comprising a second one or more search terms;
determine that one of the second one or more search terms corresponds to the language-dependent table column name associated with the table column in metadata, the table column comprising Boolean operators, and wherein the second one or more search terms are associated with an exclusion operator;
determine a second value of the table column corresponding to FALSE; and
add a second condition to the second query, the second condition specifying a technical name of the table column as determined from metadata and the second value of the table column.

5. The system according to claim 1, the processor to further execute the processor-executable program code in order to cause the computing device to:
receive a second query comprising a second one or more search terms;
determine that one of the second one or more search terms corresponds to a second language-dependent table column name associated with a second table column in metadata, the table column comprising Boolean operators, and wherein the one of the second one or more search terms is associated with an exclusion operator;
determine a second value of the second table column corresponding to FALSE; and
add a second condition to the second query, the second condition specifying a technical name of the second table column as determined from metadata and the second value of the second table column.

6. The system of claim 1, wherein the one or more search terms are plain text keyword search terms.

7. A non-transitory computer-readable medium storing program code, the program code executable by a processor of a computing system to cause the computing system to:
receive a query comprising one or more search terms;
determine that one of the one or more search terms corresponds to a language-dependent table column name associated with a table column in metadata, the table column comprising Boolean operators;
determine a value of the table column corresponding to TRUE; and
add a condition to the query to change the query, the condition specifying a technical name of the table column as determined from metadata and the value of the table column.

8. The medium according to claim 7, the program code further executable by a processor of a computing system to cause the computing system to:
remove the one of the one or more search terms from the query.

9. The medium according to claim 7, the program code further executable by a processor of a computing system to cause the computing system to:
determine that a second one of the one or more search terms corresponds to a second language-dependent table column name associated with a second table column in metadata, the second table column comprising Boolean operators, and wherein the second table column is associated with an exclusion operator;
determine a second value of the second table column corresponding to FALSE; and
add a second condition to the query, the second condition specifying a technical name of the second table column as determined from metadata and the second value of the second table column.

10. The medium according to claim 7, the program code further executable by a processor of a computing system to cause the computing system to:
receive a second query comprising a second one or more search terms;
determine that one of the second one or more search terms corresponds to the language-dependent table column name associated with the table column in metadata, the table column comprising Boolean operators, and wherein the table column is associated with an exclusion operator;
determine a second value of the table column corresponding to FALSE; and
add a second condition to the second query, the second condition specifying the technical name of the table column as determined from metadata and the second value of the table column.

11. The medium according to claim 7, the program code further executable by a processor of a computing system to cause the computing system to:
receive a second query comprising a second one or more search terms;
determine that one of the second one or more search terms corresponds to a second language-dependent table column name associated with a second table column in metadata, the second table column comprising Boolean operators, and wherein the second table column is associated with an exclusion operator;
determine a second value of the second table column corresponding to FALSE; and
add a second condition to the second query, the second condition specifying a technical name of the second table column as determined from metadata and the second value of the second table column.

12. A computer-implemented method comprising:
receiving a query comprising one or more search terms;
determining that one of the one or more search terms corresponds to a language-dependent table column name associated with a table column in metadata, the table column comprising Boolean operators;
determining a value of the table column corresponding to TRUE; and
adding a condition to the query to change the query, the condition specifying a technical name of the table column as determined from metadata and the value of the table column.

13. The method according to claim 12, further comprising:
removing the one of the one or more search terms from the query.

14. The method according to claim 12, the processor to further execute the processor-executable program code in order to cause the computing device to:
determine that a second one of the one or more search terms corresponds to a language-dependent second table column name associated with a second table column in metadata, the second table column comprising Boolean operators, and wherein the second table column is associated with an exclusion operator;
determine a second value of the second table column corresponding to FALSE; and
add a second condition to the query, the second condition specifying a technical name of the second table column as determined from metadata and the second value of the second table column.

15. The method according to claim 12, the processor to further execute the processor-executable program code in order to cause the computing device to:
receive a second query comprising a second one or more search terms;
determine that one of the second one or more search terms corresponds to the language-dependent table column name associated with the table column in metadata, the table column comprising Boolean operators, and wherein the table column is associated with an exclusion operator;
determine a second value of the table column corresponding to FALSE; and
add a second condition to the second query, the second condition specifying the technical name of the table column as determined from metadata and the second value of the table column.

16. The method according to claim 12, the processor to further execute the processor-executable program code in order to cause the computing device to:
receive a second query comprising a second one or more search terms;

determine that one of the second one or more search terms corresponds to a second language-dependent table column name associated with a second table column in metadata, the second table column comprising Boolean operators, and wherein the second table column is associated with an exclusion operator;

determine a second value of the second table column corresponding to FALSE; and add a second condition to the second query, the second condition specifying a technical name of the second table column as determined from metadata and the second value of the second table column.

\* \* \* \* \*